(No Model.)
I. R. DUNHAM.
EAR RING.
No. 324,757.                    Patented Aug. 18, 1885.
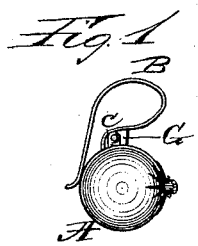
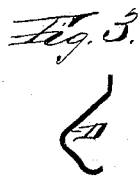
Witnesses.
Joseph Sullivan
George J. Mahlar
Inventor.
Ira R. Dunham
by J. S. Frelinghuysen
his atty.

UNITED STATES PATENT OFFICE.

IRA R. DUNHAM, OF NEWARK, NEW JERSEY.

EAR-RING.

SPECIFICATION forming part of Letters Patent No. 324,757, dated August 18, 1885.

Application filed March 9, 1885. (No model.)

*To all whom it may concern:*

Be it known that I, IRA R. DUNHAM, of Newark, county of Essex, and State of New Jersey, have made and invented a new and useful Improvement in Ear-Rings, of which the following is such full, clear, and exact description as will enable others skilled in the art to make and use the same, when taken in connection with the accompanying drawings, in which—

Figure 1 is a side view of an ear-ring made according to this my invention. Fig. 2 is a section of same. Fig. 3 is a detail view of the spring.

This my invention relates to the fastening of ear-rings; and it consists in so uniting the shank to an ear-ring that the shank will be pressed by a hidden spring against the ear-ring or some portion of it so as to keep the end of the shank against the ear-ring, and thus prevent the ear-ring leaving the ear of the wearer accidentally.

Fig. 1 shows a hollow-ball ear-ring, A, such as are ordinarily made of gold or silver. The shank B is hinged to the ball at C. The shank B is prevented from turning on its hinge in one direction by the stop c, and the stop c is kept pressed against the ear-ring by a spring, D, contained in the ball A, the spring being so shaped that a bent portion will be within the ball, and a straight portion will project through a hole in the ball left for that purpose near the point of the ball to which the shank is hinged. The end of the spring D which protrudes through the ball bears against a lug or stop on the shank, and the bent portion of the spring D, being compressed in the ball, tends to force the protruding end of the spring out farther, and it being in contact with the shank or a lug on the shank tends to turn it on its hinge, so as to keep the stop c against a shoulder fixed on the ball, in which position the end of the shank is against the ball of the ear-ring. The spring action tends to keep the end of the shank close against the ball of the ear-ring, and the shank may be easily turned back by overcoming the force of the spring action. The spring should be sufficiently strong to hold the shank in place firmly, and at the same time allow it to be turned back when it is desired so to do.

I am aware that heretofore ear-rings have been made in which the shank was fastened to the ear-ring, and so shaped that the end of the shank was near or against the ear ring, sufficient elasticity being in the shank to enable the end of the shank to be bent from the ear-ring, so as to permit the putting in and taking out of the ear-ring, and that hinged shanks have been heretofore used which catch under a hook for that purpose.

I am also aware that hinged shanks have been used to which is attached a spring interposed between the shank and ear-ring to force the end of the shank against the ear-ring, and that spiral springs have been confined in tubular ear-rings so as to force the end of the shank against the ear-ring, the stop or cam on the shank against which the spring operates being within the tube or ear-ring; but never before this my invention has an ear-ring been made containing a spring the end whereof protrudes through the ear-ring and comes in contact with the shank hinged on the outside of the ear-ring.

By the combination here shown the advantages of a spring at the hinged shank are had, and the spring being inside the ball is protected from injury and from sight, and the hinge being outside the ball is readily repaired, and the form now ordinarily in use without may be supplied with springs of the form and in the manner described.

What I claim as new, and desire to secure by Letters Patent, is—

The combination, in an ear-ring, of a hollow ball, and shank hinged thereto on the outside, and a spring contained in said hollow ball and projecting through the wall thereof in contact with the shank or a stud thereon, substantially as specified.

IRA R. DUNHAM.

Witnesses:
S. G. BATTEN, Jr.,
JOHN A. MILLER, Jr.